(12) United States Patent
Wu et al.

(10) Patent No.: US 12,306,887 B2
(45) Date of Patent: May 20, 2025

(54) METHOD, APPARATUS AND DEVICE FOR IMPLEMENTING SEARCH

(71) Applicant: Beijing Zitiao Network Technology Co., Ltd., Beijing (CN)

(72) Inventors: Ping Wu, Beijing (CN); Ruiqi Peng, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/383,222

(22) Filed: Oct. 24, 2023

(65) Prior Publication Data
US 2024/0054165 A1 Feb. 15, 2024

Related U.S. Application Data

(63) Continuation of application No. PCT/CN2022/105376, filed on Jul. 13, 2022.

(30) Foreign Application Priority Data

Aug. 9, 2021 (CN) .......................... 202110910513.6

(51) Int. Cl.
*G06F 16/738* (2019.01)
*G06F 16/438* (2019.01)
(Continued)

(52) U.S. Cl.
CPC ........ *G06F 16/9535* (2019.01); *G06F 16/438* (2019.01); *G06F 16/7867* (2019.01); *G06F 16/9538* (2019.01)

(58) Field of Classification Search
CPC .......................... G06F 16/738; G06F 16/7867
See application file for complete search history.

(56) References Cited

U.S. PATENT DOCUMENTS

2009/0319516 A1* 12/2009 Igelman ................. G06Q 30/02
707/999.005
2011/0010656 A1* 1/2011 Mokotov ............ G06F 3/04812
715/780
(Continued)

FOREIGN PATENT DOCUMENTS

CN 105893422 A 8/2016
CN 106126619 A 11/2016
(Continued)

OTHER PUBLICATIONS

International Patent Application No. PCT/CN2022/105376; Int'l Search Report; dated Sep. 26, 2022; 2 pages.
(Continued)

*Primary Examiner* — Grace Park
(74) *Attorney, Agent, or Firm* — BakerHostetler

(57) ABSTRACT

The disclosure discloses a method, an apparatus and a device for implementing search. The method includes: in response to a comment trigger request for a video, displaying a comment page of the video; determining at least one first related search word based on video content of the video and/or comment information in the comment page, the first related search word being a search word which the user may need to search for and which is determined based on the video content and/or the comment information; displaying the first related search word in a preset region of the comment page; and displaying a result page of the first related search word in response to triggering the first related search word. By determining, based on the video content and/or the comment information, and displaying the first related search word, the user may conveniently trigger the first related search word, to implement search.

15 Claims, 7 Drawing Sheets

(51) Int. Cl.
*G06F 16/78* (2019.01)
*G06F 16/9535* (2019.01)
*G06F 16/9538* (2019.01)

(56) References Cited

U.S. PATENT DOCUMENTS

| | | | |
|---|---|---|---|
| 2011/0258556 A1* | 10/2011 | Kiciman | G06Q 10/10 |
| | | | 715/751 |
| 2014/0012574 A1 | 1/2014 | Pasupalak et al. | |
| 2014/0195610 A1* | 7/2014 | Ken-Dror | G06F 16/438 |
| | | | 709/204 |
| 2017/0161237 A1* | 6/2017 | Zhang | G06F 16/748 |
| 2019/0340252 A1* | 11/2019 | Huyghe | G06F 16/532 |

FOREIGN PATENT DOCUMENTS

| | | |
|---|---|---|
| CN | 111163348 A | 5/2020 |
| CN | 111611492 A | 9/2020 |
| CN | 112287206 A | 1/2021 |
| CN | 113111286 A | 7/2021 |
| CN | 113157970 A | 7/2021 |
| CN | 113536136 A | 10/2021 |
| EP | 4276659 A1 | 11/2023 |
| GB | 2592884 A | 9/2021 |
| JP | 2015-064623 A | 4/2015 |
| JP | 2020-201738 A | 12/2020 |
| JP | 7537830 B2 | 8/2024 |
| KR | 2014-0008732 A | 1/2014 |

OTHER PUBLICATIONS

Japan Patent Application No. 2023-565470; Notice of Reasons for Refusal; dated Apr. 2, 2024; 6 pages.
European Patent Application No. 22855158.6; Extended Search Report; dated Sep. 9, 2024; 8 pages.
Japan Patent Application No. 2023-565470; Decision to Grant; Jul. 9, 2024; 5 pages.

* cited by examiner

METHOD, APPARATUS AND DEVICE FOR IMPLEMENTING SEARCH

CROSS-REFERENCE TO RELATED APPLICATION

This application is a continuation of International Patent Application No. PCT/CN2022/105376, filed on Jul. 13, 2022, which claims the priority of China patent application filed to China Patent Office on Aug. 9, 2021, with the application No. 202110910513.6 and the invention name of "METHOD, APPARATUS AND DEVICE FOR IMPLEMENTING SEARCH, AND DEVICE", the entire contents of which are incorporated into this disclosure by reference.

TECHNICAL FIELD

The application relates to the technical field of Internet technology, and in particular, relates to a method, apparatus and device for realizing search.

BACKGROUND

Video has become an important way to push contents to users. A media platform provides users with videos including various contents. Users can get related contents by watching videos.

Users may need to know more about what appears in the video after watching it. At present, users need to leave a video viewing page and go to a search page, and then search for a content of interest, which is inconvenient in the search process. How to facilitate users to search for contents related to a certain video is a technical problem that needs to be solved.

SUMMARY

In view of this, the embodiment of the application provides a method, apparatus and device for realizing search, which may facilitate users to search video-related content and improve user experience.

In order to solve the above problems, the technical scheme provided by the embodiment of the application is as follows:

In a first aspect, an embodiment of the application provides a method for realizing search, which includes the following steps:
  in response to a comment trigger request for a video, displaying a comment page of the video;
  determining at least one first related search word, wherein the first related search word is determined based on video content of the video and/or comment information in the comment page;
  displaying the first related search word in a preset area of the comment page; and
  in response to a trigger on the first related search word, displaying a search result page of the first related search word.

In a second aspect, an embodiment of the application provides an apparatus for realizing search, which includes:
  a first display unit, configured to display a comment page of a video in response to a comment trigger request for the video;
  a first determining unit, configured to determine at least one first related search word, wherein the first related search word is determined based on video content of the video and/or the comment information in the comment page;
  a second display unit, configured to display the first related search word in a preset area of the comment page; and
  a third display unit, configured to display a search result page of the first related search word in response to a trigger on the first related search word.

In a third aspect, an embodiment of the application provides an electronic device, including:
  at least one processor;
  a storage apparatus, on which at least one program is stored,
  wherein when the at least one program is executed by the at least one processor, the at least one processor is enabled to realize the above-mentioned method for realizing the search.

In the fourth aspect, the embodiment of the application provides a computer-readable medium, with a computer program stored thereon, wherein the program, when executed by a processor, realizes the above-mentioned method for realizing the search.

Thus, the embodiment of the application has the following beneficial effects:

The embodiment of the application discloses a method, apparatus and device for realizing search. By responding to a comment trigger request for a video, a comment page of the video is displayed to a user, and at least one first related search word is determined based on video content of the video and/or comment information of the comment page content; the first related search word is a search word that the user may need to search for based on the video content and/or the comment information; the first related search word is displayed in a preset area of the comment page; in response to a trigger on the first related search word, a result page of the first related search word is displayed. By determining and displaying the first related search word that the user may need to search for based on the video content and/or the comment information, it is convenient for the user to trigger the first related search word in the preset area of the comment page and realize the search for the first related search word. In this way, the path for users to make a search can be shortened, input costs of users can be reduced, and it is convenient for users to understand the video content.

DETAILED DESCRIPTION

In order to make the above objects, features and advantages of this application more obvious and easy to understand, the embodiments of this application will be further described in detail with the attached drawings and specific embodiments.

In order to facilitate the understanding and explanation of the technical scheme provided by the embodiment of this application, the background technology of this application will be explained first.

After studying a traditional search process of users after watching videos, the inventors found that in a case where users are interested in some content in videos, users may enter a search page to search for related content after watching videos. For example, in a case where users see a video of food introduction, they may be interested in how to make an "egg custard" mentioned in the video. After watching the video, users will exit a video display page and enter the search page to search for "egg custard". Users need to switch pages during the search, which is very inconvenient.

The embodiment of the application discloses a method, apparatus and device for realizing search. By responding to a comment trigger request for a video, a comment page of the video is displayed to a user, and at least one first related search word is determined based on video content of the video and/or comment information of the comment page content; the first related search word is a search word that the user may need to search for based on the video content and/or the comment information; the first related search word is displayed in a preset area of the comment page; in response to a trigger on the first related search word, a result page of the first related search word is displayed. By determining and displaying the first related search word that the user may need to search for based on the video content and/or the comment information, it is convenient for the user to trigger the first related search word in the preset area of the comment page and realize the search for the first related search word. In this way, the path for users to make a search can be shortened, input costs of users can be reduced, and it is convenient for users to understand the video content.

Figure 1A:
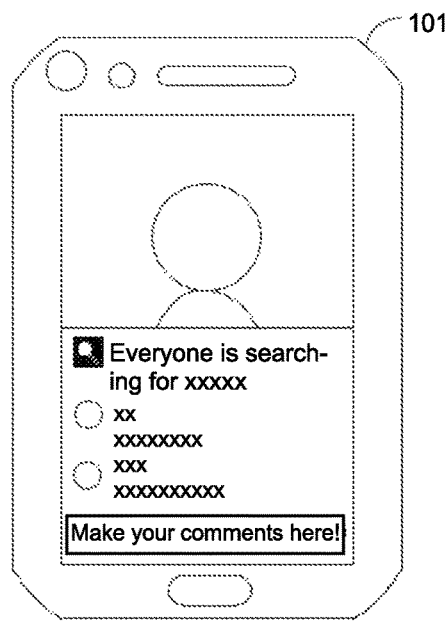
FIG. 1a is a schematic frame diagram of an exemplary application scenario provided by an embodiment of the present application.
Figure 1B:
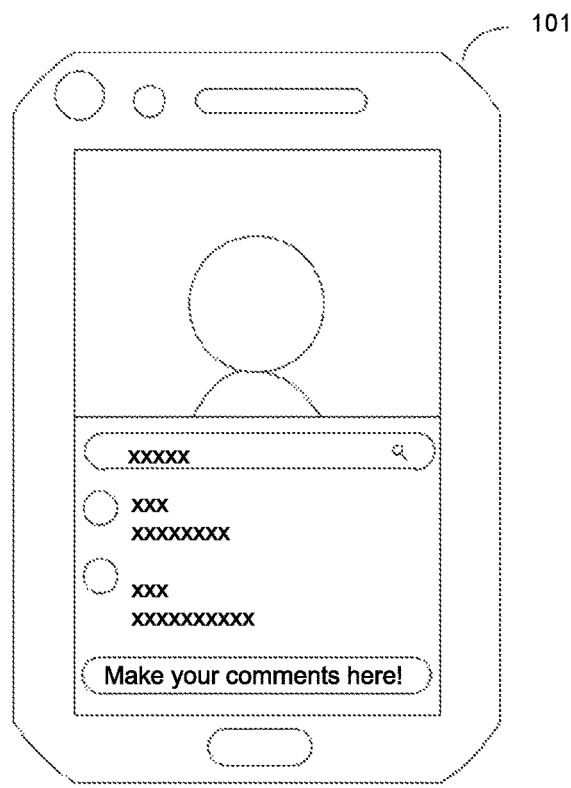
FIG. 1b is a schematic frame diagram of another exemplary application scenario provided by an embodiment of the present application.
Figure 1C:
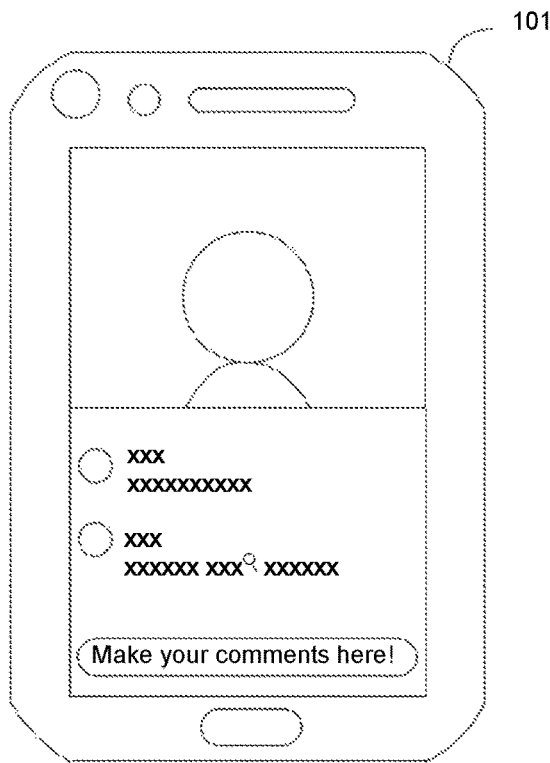
FIG. 1c is a schematic frame diagram of another exemplary application scenario provided by an embodiment of the present application.

In order to facilitate the understanding of the method for realizing the search provided by the embodiment of the present application, the following description will be made in combination with the scene examples shown in FIG. 1*a*, FIG. 1*b* and FIG. 1*c*. Referring to FIG. 1*a*, FIG. 1*b* and FIG. 1*c*, this figures are schematic frame diagrams of an exemplary application scenario provided by an embodiment of the present application.

In a practical application, in a case where a user watches a video with a terminal device 101, comments on the video are triggered. The terminal device 101 displays the comment page of the video in response to the comment trigger request for the video. The terminal device 101 displays the first related search word and/or the second related search word in the preset area of the comment page.

The first related search word is determined based on the video content of the video and/or the comment information in the comment page. In a case where the user wants to further search for the first related search word while watching the video, the first related search word may be triggered. In response to a trigger on the first related search word, the terminal device 101 displays the search result page of the first related search word. The second related search word is determined based on the comment information in the comment page. In a case where the user wants to further search for the second related search word while watching the video, the second related search word may be triggered. The terminal device 101 displays the search result page of the second related search word in response to a trigger on the second related search word.

As shown in FIG. 1*a*, the terminal device 101 may display the first related search word at a top position of the comment page. The user may search for the first related search word by triggering the first related search word. As shown in FIG. 1*b*, the first related search word may also be displayed in a search box at the top of the comment page. The user may directly search the first related search word by triggering a search button in the search box. The user may also edit the first related search word in the search box, and then search the edited search word. As shown in FIG. 1*c*, in the comment page, the second related search word may also be displayed in the comment information. And the second related search word is marked with a "magnifying glass" indicator, which is convenient for users to determine the second related search word in the comment information. It should be noted that in some possible implementations, the first related search word and the second related search word may be displayed at the same time. For example, the display modes of FIG. 1*a* and FIG. 1*c* may be combined to display the first related search word and the second related search word at the same time. For another example, the display modes of FIG. 1*b* and FIG. 1*c* may be combined to display the first related search word and the second related search word at the same time.

It can be understood by those skilled in the art that the frame diagram shown in FIG. 1*a*, FIG. 1*b* or FIG. 1*c* is only one example in which the embodiment of the present application can be realized. The application scope of the embodiment of the present application is not limited by any aspect of this framework.

In order to facilitate the understanding of this application, a method for realizing search provided by an embodiment of this application is described below with reference to the attached drawings.

Figure 2:
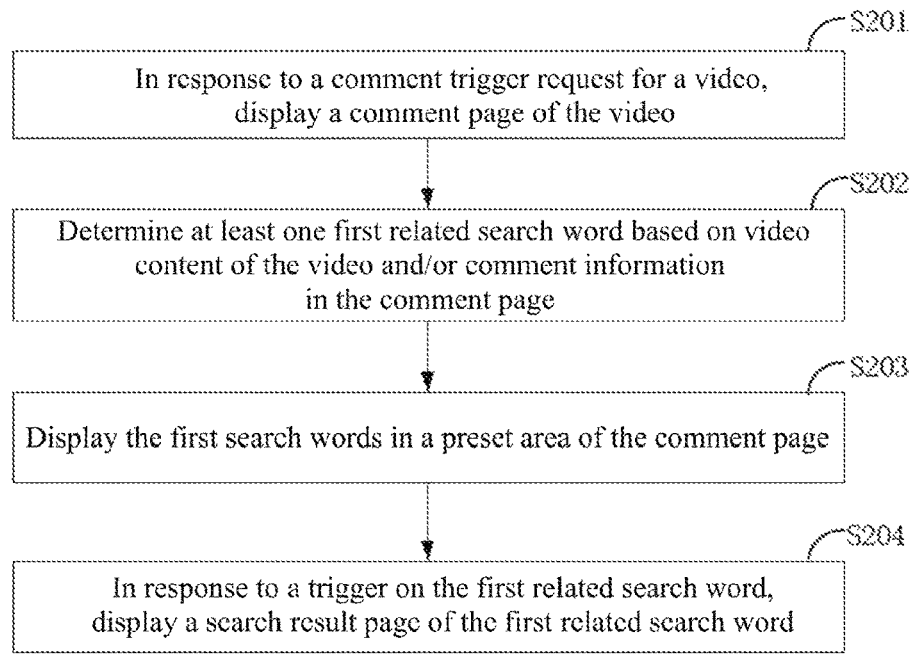
FIG. 2 is a flowchart of a method for realizing search provided by an embodiment of the present application.

Refer to FIG. 2, which is a flowchart of a method for realizing search provided by an embodiment of the present application. As shown in FIG. 2, the method may include the following steps S201-S204:

At S201: In response to a comment trigger request for a video, a comment page of the video is displayed.

Users may also comment on the content of the video when watching it. The video has a corresponding comment page. The comment page is used to display the comments on the video content of the video made by users who watch the video.

In response to the comment trigger request for the video, users are presented with the comment page of the video, so that the users may view other users' comments on the video or post their own comments.

In one possible implementation, the embodiment of the application provides a specific implementation of displaying the comment page of the video in response to the comment trigger request for the video. Please refer to the following for details.

At S202: At least one first related search word is determined, wherein the first related search word is determined based on the video content of the video and/or the comment information in the comment page.

The first related search word may be determined based on one or more of the video content and the comment information in the comment page. In one possible implementation, the first related search word is determined according to one or more of the video content of the video and the text information included in the video. Herein the video content of the video may be related to the video, such as a title of the video, a copy of the video, an account for publishing the video and a theme of the video. The text information included in the video refers to the text information in the video, for example, subtitles and special effects in the video. Text information in video may be determined by optical character recognition technology. For example, the title of the video is "How to Make Egg Custard". The subtitles in the video are a specific cooking process of egg custard. Then "egg custard" may be used as the first related search word.

In addition, the comment information in the comment page includes video-related content commented by users. The first related search word is determined based on the comment information in the comment page. Specifically, it may be determined based on the target comment information of the video. The target comment information is obtained based on the comment information in the comment page. The target comment information may be the comment information with high popularity among the comment information. The target comment information may be determined by an attribution model.

At S203: The first related search word is displayed in the preset area of the comment page.

The first related search word is displayed in the preset area of the comment page, so that the user may trigger the first related search word in the preset area of the comment page.

For example, the top area of the comment page may be used as the preset area for displaying the first related search word.

In one possible implementation, the embodiment of the present application provides a specific implementation of displaying the first related search word in the preset area of the comment page. Please refer to below for details.

In addition, a sensitive word service or an audit model may be used to check the first related search word, and in a case where the first related search word is sensitive, they will not be displayed.

In some cases, some videos may also be set in advance to stop showing the first related search word in the comment page of the video.

At S204: In response to a trigger on the first related search word, a search result page of the first related search word is displayed.

In a case where a user needs to trigger the first related search word, the user may trigger the first related search word displayed in the preset area in the comment page. In response to a trigger on the first related search word, the first related search word is searched, and the search result page of the first related search word is displayed.

In some possible implementations, the search result page may be different for different first related search words. According to the four different attribute categories to which the first related search word belong, the embodiment of the present application provides four specific embodiments of displaying the search result page of the first related search word in response to a trigger on the first related search word, and please see the following for details.

It should be noted that after the search result page of the first related search word is displayed, in a case where the user clicks a Clear button in the search page, the first related search word in the input field may be cleared. In a case where the user clicks the button to cancel the search, or clicks a back button, the user may return to the comment page. In addition, special operation gestures may be defined to return to the comment page from the search result page, such as the gesture of sliding left and the gesture of sliding right.

Based on the related contents of S201-S204, it can be seen that by determining and displaying the first related search word that the user may need to search for based on the video content and/or comment information, it is convenient for the user to trigger the first related search word in the preset area of the comment page and realize the search for the first related search word. In this way, the search path of users can be shortened, the input cost of users can be reduced, and it is convenient for users to understand the video content.

In one possible implementation, the first related search word includes a plurality of words. The embodiment of the application provides a specific implementation mode of displaying the first related search word in the preset area of the comment page, which specifically includes the following steps.

The attribute category of the first related search word is identified.

The first related search word of the attribute category are displayed in the preset area corresponding to each attribute category on the comment page.

The attribute category of the first related search word may refer to a search word category to which the first related search word belongs. For example, the attribute categories may include many types, such as commodity type, event type, encyclopedia entity type, inquiry type and person name type.

Figure 3:
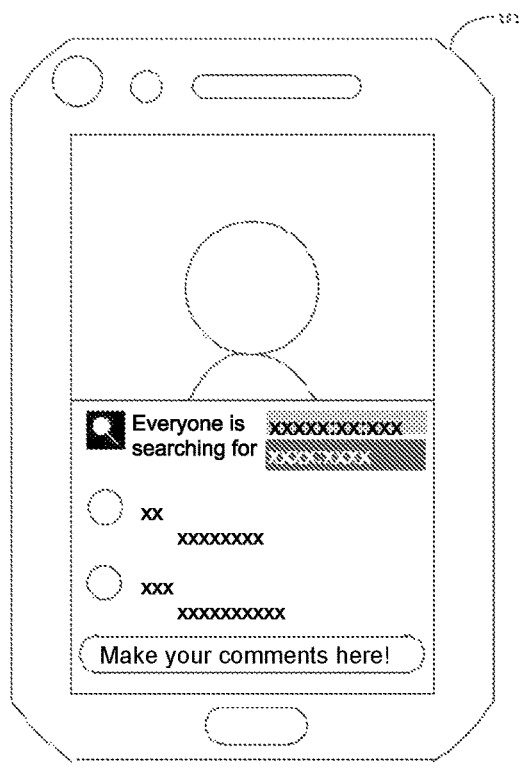
FIG. 3 is a schematic diagram of a video comment page provided by an embodiment of the present application.

For the first related search words with different attribute categories, the preset areas displayed may be different. Refer to FIG. 3, a schematic diagram of the video comment page provided by an embodiment of the present application. Herein the preset area of light background and the preset area of dark background represent different preset areas. The first related search word of the same attribute category are displayed on the same line, occupying the same preset area, and a plurality of first related search words may be connected by semicolons. The first related search word of different attribute categories are displayed in different lines, occupying different preset areas, and a plurality of first related search words may be connected by semicolons.

In one possible implementation, the first related search words corresponding to the same attribute category may be displayed in the corresponding preset area. For example, the first related search words belonging to the commodity type may be displayed in the first preset area from top to bottom of the comment page, and the first related search words belonging to the event type may be displayed in the second preset area from top to bottom of the comment page.

In the embodiment of the application, by displaying the first related search words in the corresponding preset areas according to the attribute categories, it is convenient for users to determine a first related search word in a corresponding preset area based on different attribute categories and trigger it.

Further, the attribute category of the first related search word is commodity type, that is to say, the first related search word is a search word related to commodities. For example, the first related search word may be a search word such as a commodity name, a commodity function description, or the like.

Based on this, the embodiment of the application provides a specific implementation of displaying the search result page of the first related search word in response to a trigger on the first related search word, which includes the following two steps:

At A1: in response to a trigger on the first related search word, a plurality of types of first multimedia resources corresponding to the first related search word are displayed in the first display area on the search result page; wherein the first multimedia resources include multimedia contents and commodity information contents, and the multimedia contents include any one of commodity recommendation videos, commodity live broadcast videos and commodity multimedia contents extracted from a commodity detail page; and the first multimedia resources are displayed in the form of multimedia cards, which are arranged in a preset direction.

Figure 4:
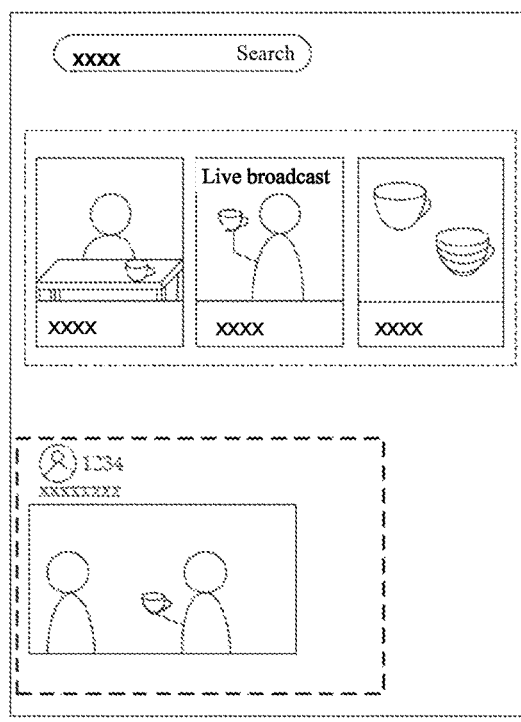
FIG. 4 is a schematic diagram of a search result page of a first related search word provided by an embodiment of the present application.

Refer to FIG. 4, FIG. 4 is a schematic diagram of the search result page of the first related search word provided by an embodiment of the present application.

The search result page triggered by the first related search word includes a first display area and a second display area. The first display area may be an area at the top in the display area of the search result. Referring to FIG. 3, the first display area is an area surrounded by a thin dashed line, and the second display area is an area surrounded by a thick dashed line.

The first display area displays a plurality of types of first multimedia resources corresponding to the first related search word. Herein the first multimedia resources include multimedia contents and commodity information contents. The multimedia contents include any one of commodity recommendation videos, commodity live broadcast videos and commodity multimedia contents extracted from a commodity detail page. The commodity recommendation video may be a pre-recorded video about commodity recommendation. The video of the commodity live broadcast room may be a video of the live broadcast room where the commodity is currently recommended. The commodity multimedia contents extracted from the commodity detail page may be multimedia contents such as videos or pictures introduced by merchants. The commodity information content may be information content about the name and price of the commodity. Herein, the commodity information content may be text content.

The first multimedia resources may be displayed in the form of multimedia cards. The multimedia card is a form of displaying multimedia in the shape of a card. For example, in a card shape, multimedia contents such as videos or images are displayed in the upper half area, and commodity information contents such as texts are displayed in the lower half area.

A plurality of types of multimedia cards may be arranged in the preset direction, for example, in a horizontal direction.

At A2: search result videos corresponding to the first related search word in the second display area on the search result page are displayed.

The search result page also includes a second display area. The second display area is used to show the search result videos corresponding to the first related search word. The search result videos may be videos whose video contents provided by a video platform match the first related search word.

Based on the above contents, it can be seen that by displaying the first multimedia resources and the search result videos in different areas in the search result page corresponding to the first related search word, it is convenient for users to select and browse the search results based on different needs. The first multimedia resources are displayed in the first display area, which is convenient for the user to quickly understand the information of the commodities corresponding to the first related search word of the commodity type and improves the user's experience.

Further, the commodity information contents may be obtained based on multimedia contents, and the commodity information contents are consistent with the commodity information in the multimedia contents.

Based on this, the embodiment of the application also provides a method for realizing the search, which includes the following two steps in addition to the above steps:

At B1, in response to a trigger on a target multimedia content, a commodity recommendation video, a commodity live broadcast room or a commodity detail page corresponding to the target multimedia content is displayed according to the preset display mode; wherein, the target commodity multimedia content is a multimedia content included in any multimedia card.

Users may trigger a multimedia content included in any multimedia card, i.e., a target multimedia content. In response to a trigger on a target multimedia content, the content corresponding to the target multimedia content is displayed according to the preset display mode.

Herein, the preset display mode may be a preset video display mode. For example, it may be a full-screen display mode, a half-screen display mode or a small window display mode.

Specifically, in a case where the target multimedia content is a commodity recommendation video, the commodity recommendation video is displayed in the preset display mode. In a case where the target multimedia content is the commodity live room video, the commodity live room is displayed according to the preset display mode. In a case where the target multimedia content is the commodity multimedia content extracted from the commodity detail page, the commodity detail page is displayed according to the preset display mode.

In one possible implementation, a page link corresponding to the multimedia content may be set so as to jump to the corresponding commodity recommendation video display page, commodity live broadcast room page or commodity detail page according to the corresponding page link after the target multimedia content is triggered.

At B2: in response to the trigger on the target commodity information content, the commodity purchase page corresponding to the target commodity information content is displayed; wherein, the target commodity information content is a commodity information content included in any multimedia card.

Users may also trigger a commodity information content included in any multimedia card, i.e., a target commodity information content. In response to the trigger on the target commodity information content, the commodity purchase page corresponding to the target commodity information content is displayed.

In one possible implementation, the page link on the commodity purchase page corresponding to the commodity information content may be set, so that after the commodity information content is triggered, it may jump to the corresponding commodity purchase page according to the page link corresponding to the commodity information content.

Based on the above contents, it can be seen that by displaying the corresponding page in response to a trigger on the target multimedia content or the target commodity information content, it is convenient for users to obtain more accurate commodity information based on the first multimedia resources displayed in the search result page, and the user experience is improved.

In another possible implementation, the attribute category of the first related search word may be an event type. The event type means that the first related search word is an event with certain persistence. Based on this, the embodiment of the application also provides a specific embodiment of displaying the search result page of the first related search word in response to a trigger on the first related search word, which specifically includes:

in response to a trigger on the first related search word, multimedia cards corresponding to respective event time points in an order of the event time points are displayed on the search result page; wherein, each multimedia card is used for displaying an event video and event text information corresponding to the corresponding event time point.

The user may trigger the first related search word belonging to the event type to realize the search for the first related search word.

Figure 5:
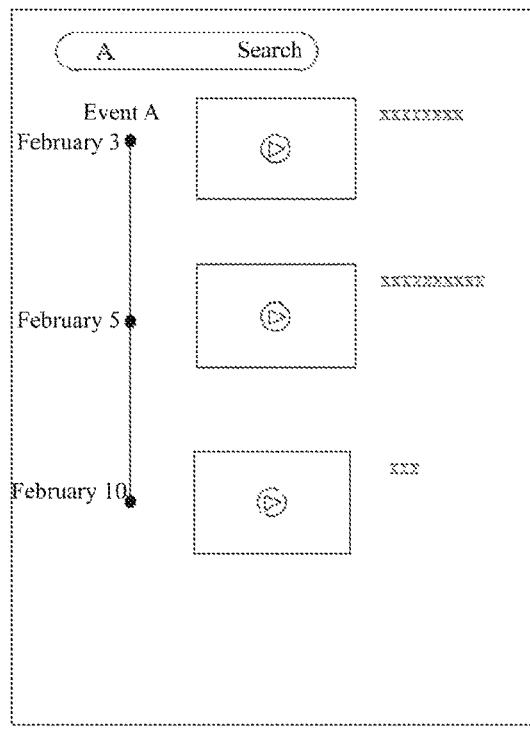
FIG. 5 is a schematic diagram of another search result page of a first related search word provided by an embodiment of the present application.

In response to a trigger on the first related search word, the search results of the first related search word belonging to the event type are displayed in the search result page. Refer to FIG. 5, which is a schematic diagram of another search result page of the first related search word provided by the embodiment of the present application. The events corresponding to the first related search word belonging to the event type have different time occurrence processes, and the multimedia cards corresponding to respective event nodes may be displayed in the search result page in the event time points order. The multimedia card is a form of displaying multimedia resource in the shape of a card.

For example, for an event A, it began to happen on February 3rd, made progress in stages on February 5th and ended on February 10th. Then the search result page may be displayed according to the event time point order of February 3, February 5 and February 10.

Herein a multimedia card corresponding to an event time point is used to display the event video and event text information corresponding to the corresponding event time point. The event video may be a video related to the event, for example, it may be a video introducing the event, or a recorded video aiming at the event. The text information of that event may be the text introducing the event. It should be noted that there may be one or more event videos corresponding to the same event time point, which is not limited by the embodiment of this application.

In the embodiment of the application, the multimedia cards corresponding to respective event time points are displayed in the search result page in the event time points order, so that the user may quickly understand the process of the event occurring at different event time points, and the user experience is improved.

Further, the embodiment of the application also provides a method for realizing search, which includes the following three steps in addition to the above steps:

At C1, in response to a trigger on a target event video, the target event video is displayed according to the preset display mode; wherein the target event video is any one of the event videos.

The user may trigger any of the event videos, i.e., a target event video. In response to the trigger on the target event video, the target event video is displayed in the preset display mode. Herein, the preset display mode may be a preset video display mode. For example, it may be a full-screen display mode, a half-screen display mode or a small window display mode.

At C2, in response to a first sliding operation in a vertical direction, the next event video corresponding to the target event video is displayed in the preset display mode; wherein the sequence number of the next event video on the search result page is greater than the sequence number of the target event video.

The user may perform the first sliding operation in the vertical direction after watching the target event video displayed in the preset display mode. In response to a first sliding operation in a vertical direction, the next event video corresponding to the target event video may be displayed in the preset display mode. Herein the first sliding operation in the vertical direction may be a vertical upward sliding.

The sequence number of the next event video of the target event video in the search result page is greater than a sequence number of the target event video. The sequence number of the event videos in the search result page may be determined according to the sequence of the event time points corresponding to the event videos. For example, an event video with a later event time point may be assigned a larger sequence number.

Specifically, the next event video of the target event video may be the event video of the next event time points corresponding to the target event video. Taking the search result page of the above event A as an example, in a case where the target event video is the video of the event that happened on February 3rd, the next event video may be the video of the event that happened on February 5th.

At C3, in response to the second sliding operation in the vertical direction, the previous event video corresponding to the target event video is displayed in the preset display mode; wherein, the sequence number of the previous event video on the search result page is smaller than the sequence number of the target event video.

The user may perform a second sliding operation in the vertical direction after watching the video of the target event displayed in the preset display mode. In response to the second sliding operation in the vertical direction, the previous event video corresponding to the target event video may be displayed in the preset display mode. Herein the second sliding operation in the vertical direction may be a vertical downward sliding.

The sequence number of the previous event video of the target event video in the search result page is smaller than the sequence number of the target event video. The sequence number of the event video in the search result page may be determined according to the sequence of the event time point corresponding to the event video. For example, an event video with an earlier event time point may be assigned a smaller sequence number.

Specifically, the previous event video of the target event video may be the event video of the previous event time point of the event time points corresponding to the target event video. Taking the search result page of the above event A as an example, in a case where the target event video is an event video that happened on February 5th, the previous event video may be an event video that happened on February 3rd.

In the embodiment of the application, by responding to the trigger operation or the sliding operation, the event video may be displayed to the user, which is convenient for the user to understand the occurrence process of the event.

In another possible implementation, the attribute category of the first related search word may be an encyclopedia entity type. The encyclopedia entity type means that the first related search word refer to search words involving multiple disciplines. Based on this, the embodiment of the application also provides a specific embodiment of displaying the search result page of the first related search word in response to a trigger on the first related search word, which specifically includes the following two steps:

At D1, in response to a trigger on the first related search word, encyclopedia critical text information corresponding to the first related search word and at least one dimension of the second multimedia resource are displayed in the first display area on the search result page; wherein the second multimedia resource of each dimension corresponds to one attribute of the encyclopedia type to which the first related search word belong; and the second multimedia resources of respective dimensions are displayed in the form of multimedia cards, which are arranged in the preset direction.

The user may trigger the first related search word belonging to the encyclopedia entity type to realize the search for the first related search word.

Figure 6:
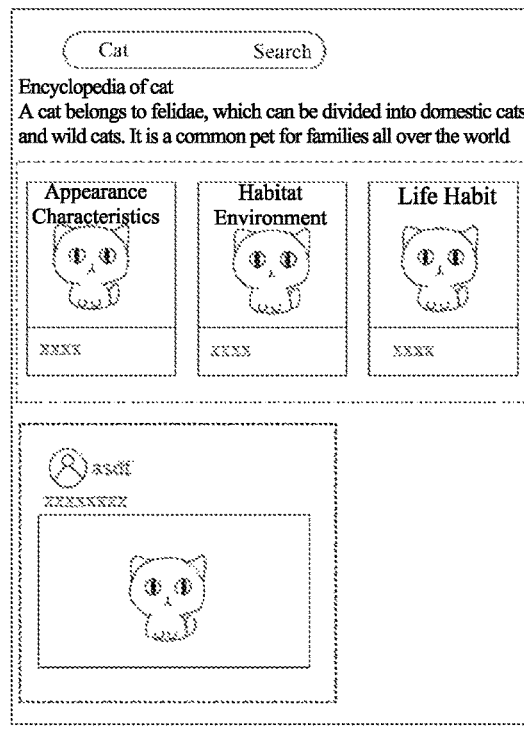
FIG. 6 is a schematic diagram of yet another search result page of a first related search words provided by the embodiment of the present application.

In response to a trigger on the first related search word, the search result of the first related search word belonging to the encyclopedia entity type is displayed in the search result page. Refer to FIG. 6, which is a schematic diagram of the search result page of another first related search word provided by an embodiment of the present application. The search result page of the first related search word includes the first display area and the second display area. Referring to FIG. 6, the first display area is an area surrounded by a thin dashed line, and the second display area is an area surrounded by a thick dashed line.

The first display area displays the encyclopedia critical text information corresponding to the first related search word and at least one dimension of the second multimedia resource. Herein the encyclopedia critical text information corresponding to the first related search word may be composed of the critical text of the encyclopedia content corresponding to the first related search word. The encyclopedia critical text information may be the text information of a brief introduction to the first related search word. The second multimedia resource of each dimension corresponds to one attribute of the encyclopedia type to which the first related search word belong. For example, if the first related search word is "cat", the corresponding dimension may include specific encyclopedia-type attributes such as appearance characteristics, habitat environment and living habits.

The second multimedia resource may include one or more media resources of video, text and pictures.

The second multimedia resource of each dimension may be displayed in the form of multimedia card. The multimedia card is a form of displaying multimedia in the shape of a card. The multimedia cards are arranged in the preset direction. Specifically, for example, multimedia cards may be arranged horizontally.

At D2: search result videos corresponding to the first related search word are displayed in the second display area on the search result page of the first related search word.

The search result page also includes a second display area. The second display area is used to show the search result videos corresponding to the first related search word. The search result videos may be videos whose video contents provided by the video platform match the first related search word.

Based on the above contents, it can be seen that by displaying the encyclopedia critical text information corresponding to the first related search word, at least one dimension of the second multimedia resources and the search result videos in the search result page corresponding to the first related search word, it is convenient for users to select and browse the search results based on different needs. Displaying the encyclopedia critical text information corresponding to the first related search word and at least one dimension of the second multimedia resources in the second display area is convenient for users to quickly understand the encyclopedia contents corresponding to the first related search word of the encyclopedia entity type, thus improving the user experience.

Further, the second multimedia resources of each dimension include a plurality of encyclopedia videos. That is to say, the second multimedia resource of each dimension includes a plurality of encyclopedic videos that may be displayed.

Based on this, the embodiment of the application provides a method for realizing search, which includes the following three steps in addition to the above steps:

At E1, in response to the trigger on the target encyclopedia video, the target encyclopedia video is displayed according to the preset display mode; wherein, the target encyclopedia video is an encyclopedia video included in any multimedia card.

The user may trigger an encyclopedia video included in any multimedia card, i.e., trigger a target encyclopedia video. In response to the trigger on the target encyclopedia video, the target encyclopedia video is displayed in the preset display mode. Herein, the preset display mode may be a preset video display mode. For example, it may be a full-screen display mode, a half-screen display mode or a small window display mode.

At E2: the next encyclopedia video corresponding to the target encyclopedia video is displayed in response to a first sliding operation in a vertical direction; in a case where the target encyclopedia video is not the last encyclopedia video in the current multimedia card, the sequence number of the next encyclopedia video in the current multimedia card is greater than the sequence number of the target encyclopedia video in the current multimedia card; or, in a case where the target encyclopedia video is the last encyclopedia video in the current multimedia card, the sequence number of the multimedia card corresponding to the next encyclopedia video is greater than the sequence number of the multimedia card corresponding to the target encyclopedia video.

The user may perform the first sliding operation in the vertical direction after watching the target encyclopedia video displayed according to the preset display mode. In response to a first sliding operation in a vertical direction, the next encyclopedia video corresponding to the target encyclopedia video may be displayed in the preset display mode. Herein the first sliding operation in the vertical direction may be a vertical upward sliding.

In a case where the target encyclopedia video is not the last encyclopedia video in the current multimedia card, the next encyclopedia video may be determined in the current multimedia card. The sequence number of the next encyclopedia video of the target encyclopedia video in the current multimedia card is greater than the sequence number of the target encyclopedia video in the current multimedia card. The sequence number of the encyclopedia video in the current multimedia card may be determined according to a preset playing order of the encyclopedia video in the current multimedia card. For example, taking the search result page of "cat" as an example, there may be three encyclopedia videos in the multimedia cards corresponding to an appearance feature, so the sequence numbers of the three encyclopedia videos in the multimedia cards corresponding to the appearance feature may be determined according to the preset playing order of the three encyclopedia videos. For example, the sequence number of the first played encyclopedia video in the playing order is set to 1, the sequence number of the second played encyclopedia video in the playing order is set to 2, and the sequence number of the third played encyclopedia video in the playing order is set to 3. In a case where the target encyclopedia video is the encyclopedia video with the sequence number of 2 in the multimedia card corresponding to the appearance feature, the next encyclopedia video may be the encyclopedia video with the sequence number of 3 in the multimedia card corresponding to the appearance feature.

In a case where the target encyclopedia video is the last encyclopedia video in the current multimedia card, the encyclopedia video with the sequence number of the multimedia card greater than the sequence number of the multimedia card corresponding to the target encyclopedia video may be taken as the next encyclopedia video. Herein multimedia cards also have corresponding sequence numbers. The sequence numbers of multimedia cards may be determined according to the sequence of display positions. For example, the multimedia card corresponding to the appearance feature is displayed first in the first display area, so its corresponding sequence number is 1. The multimedia card corresponding to the habitat is displayed second in the first display area, so its corresponding sequence number is 2. In a case where the target encyclopedia video is the last encyclopedia video in the current multimedia card, it means that there is no next encyclopedia video with the target encyclopedia video in the current multimedia card. The encyclopedia video in the next multimedia card of the current multimedia card is selected as the next encyclopedia video of the target encyclopedia video.

Still taking the search result page of "cat" as an example, in a case where the target encyclopedia video is arranged in the multimedia card corresponding to the appearance feature, the encyclopedia video in the multimedia card corresponding to the habitat environment may be taken as the next encyclopedia video.

At E3: in response to a second sliding operation in the vertical direction, the previous encyclopedia video corresponding to the target encyclopedia video is displayed in the preset display mode; wherein, in a case where the target encyclopedia video is not the first encyclopedia video in the current multimedia card, the sequence number of the previous encyclopedia video in the current multimedia card is smaller than the sequence number of the target encyclopedia video in the current multimedia card, or in a case where the target encyclopedia video is the first encyclopedia video in the current multimedia card, the sequence number of the multimedia card corresponding to the previous encyclopedia video is smaller than the sequence number of the multimedia card corresponding to the target encyclopedia video.

The user may perform the second sliding operation in the vertical direction after watching the target encyclopedia video displayed according to the preset display mode. In response to a second sliding operation in the vertical direction, the previous encyclopedia video corresponding to the target encyclopedia video may be displayed in the preset display mode. Herein the second sliding operation in the vertical direction may be a vertical downward sliding.

In a case where the target encyclopedia video is not the first encyclopedia video in the current multimedia card, the previous encyclopedia video may be determined in the current multimedia card. The sequence number of the previous encyclopedia video of the target encyclopedia video in the current multimedia card is smaller than the sequence number of the target encyclopedia video in the current multimedia card. The sequence number of the encyclopedia video in the current multimedia card may be determined according to the preset playing order of the encyclopedia video in the current multimedia card. For example, in a case where the target encyclopedia video is an encyclopedia video with the sequence number of 2 in the multimedia card corresponding to the appearance feature, the previous encyclopedia video may be the encyclopedia video with the sequence number of 1 in the multimedia card corresponding to the appearance feature.

In a case where the target encyclopedia video is the first encyclopedia video in the current multimedia card, the encyclopedia video with the sequence number of the multimedia card smaller than the sequence number of the multimedia card corresponding to the target encyclopedia video may be taken as the previous encyclopedia video. Herein a multimedia card also has a corresponding sequence number. The sequence numbers of multimedia cards may be determined according to the displaying order.

Taking the search result page of "cat" as an example, in a case where the target encyclopedia video is an encyclopedia video with the sequence number of 1 in the multimedia card corresponding to the habitat, the encyclopedia video in the multimedia card corresponding to the appearance feature may be taken as the next encyclopedia video.

In the embodiment of the application, by responding to the trigger operation or the sliding operation, the encyclopedia video may be flexibly displayed to the user, which is convenient for the user to understand the content of the search result.

In another possible implementation, the attribute category of the first related search word may be a query type. The query type may refer to the first related search word belonging to the query implementation.

Based on this, the embodiment of the application also provides a specific embodiment of displaying the search result page of the first related search word in response to a trigger on the first related search word, which specifically includes the following two steps:

At F1, in response to a trigger on the first related search word, a third multimedia resource is displayed in the first display area on the search result page, wherein the third multimedia resource includes a target video and a plurality of critical pictures corresponding to the target video; wherein, the first display area includes a first sub-area and a second sub-area, wherein the target video is displayed in the first sub-area and part or all of a plurality of critical pictures are displayed in the second sub-area, and the dimensions of the first sub-area and the second sub-area are the same in the preset direction.

The user may trigger the first related search word belonging to the inquiry type to realize the search for the first related search word.

Figure 7A:
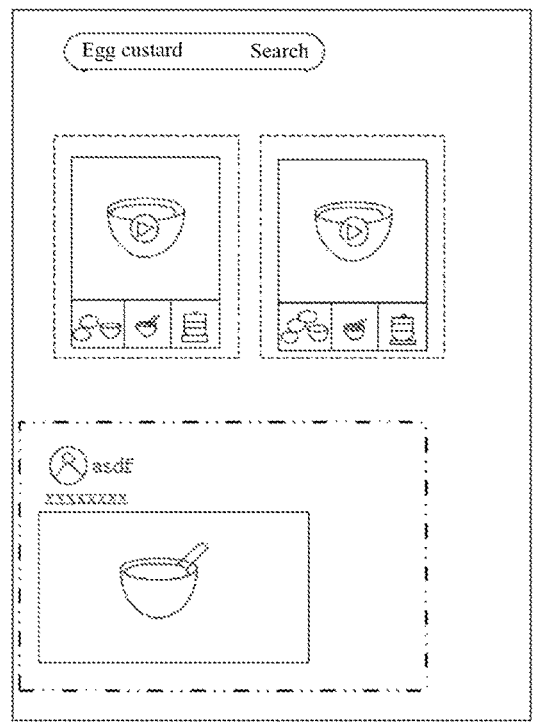
FIG. 7*a* is a schematic diagram of yet another search result page of a first related search word provided by an embodiment of the present application.
Figure 7B:
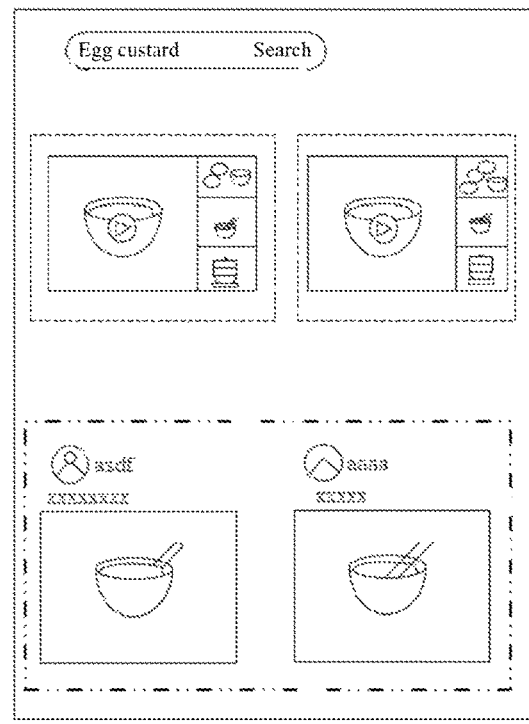
FIG. 7*b* is a schematic diagram of yet another search result page of a first related search word provided by the embodiment of the present application.

In response to a trigger on the first related search word, the search results of the first related search word belonging to the inquiry type are displayed in the search result page. Refer to FIG. 7a and FIG. 7b, which are schematic diagrams of the search result page of another first related search words provided by an embodiment of the present application. The search result page of the first related search word includes the first display area and the second display area. Herein, the first display area also includes the first sub-area and the second sub-area. Referring to FIG. 7a and FIG. 7b, the first display area is an area surrounded by a thin dashed line, and the second display area is an area surrounded by a thick dashed line.

The third multimedia resource is displayed in the first display area. The third multimedia resource includes a target video and a plurality of critical pictures corresponding to the target video. The target video is a video related to the first related search word, and the critical picture is a picture corresponding to the target video. For example, in a case where the first related search word is "egg custard", the target video may be the step of making "egg custard", and the critical picture may be the picture corresponding to the key step of making "egg custard" in the target video.

The target video is displayed in the first sub-area, and some or all of the critical pictures are displayed in the second sub-area. The dimensions of the first sub-area and the second sub-area are the same in the preset direction. The preset direction is related to a relative position relationship between the first sub-area and the second sub-area in the first display area. For example, in a case where the first sub-area is located in the upper part of the first display area, the second sub-area is located in the lower part of the first display area. The dimensions of the first sub-area and the second sub-area are the same in the horizontal direction, i.e., the width of the first sub-area and the width of the second sub-area are the same. For another example, in a case where the first sub-area is located in the left half of the first display area, the second sub-area is located in the right half of the first display area. The dimensions of the first sub-area and the second sub-area are the same in the vertical direction, i.e., the height of the first sub-area and the height of the second sub-area are the same.

At F2: search result videos corresponding to the first related search word are displayed in the second display area on the search result page of the first related search word.

The search result page also includes the second display area. The second display area is used to show the search result videos corresponding to the first related search word. The search result videos may be videos whose video contents provided by the video platform match the first related search word.

Based on the above contents, it can be seen that by displaying the third multimedia resource and the search result video in different areas in the search result page corresponding to the first related search word, it is convenient for users to select and browse the search results based on different needs. The target video is displayed in the first sub-area in the first display area, and the critical pictures are displayed in the second sub-area, so that the key parts in the target video may be displayed, which is convenient for users to quickly understand the contents of search results.

In one possible implementation, an embodiment of the present application provides a comment page for displaying a video in response to a comment trigger request for the video, including the following steps.

In response to the comment trigger request for a video, a comment page of the video is displayed floating above the video; or in response to the comment trigger request for the video, the comment page displaying the video is displayed by popping up from the target direction of the video.

Figure 8A:
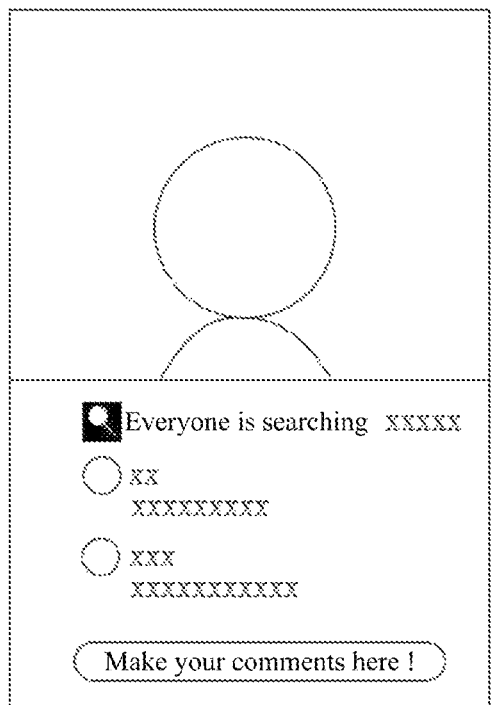
FIG. 8*a* is a schematic diagram of another comment page of a video provided by an embodiment of the present application.

In one case, the comment page of the video may be displayed floating above the video. Refer to FIG. 8a, which is a schematic diagram of the comment page of another video provided by an embodiment of the present application. The comment page of the video may block part of the display area of the video.

Figure 8B:
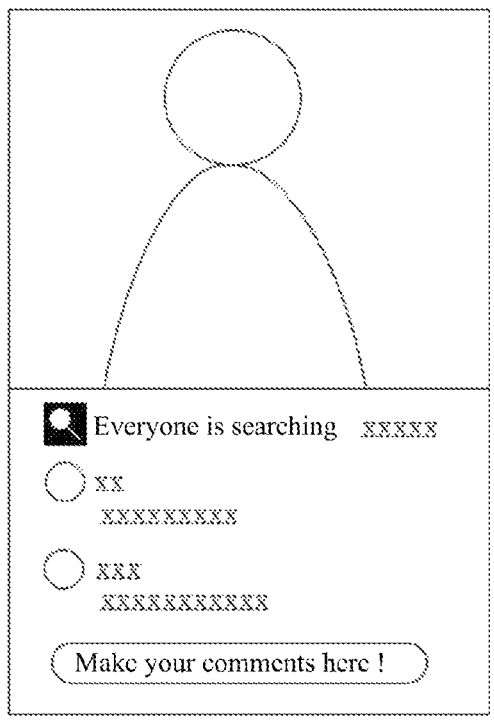
FIG. 8*b* is a schematic diagram of yet another comment page of a video provided by an embodiment of the present application.

In another case, the comment page of the video is displayed by popping up in the target direction of the video. Refer to FIG. 8b, and FIG. 8b a schematic diagram of another comment page of a video provided by an embodiment of the present application. The video may adjust a display area to provide the display area for the comment page. In such cases, the comment page will not block the display area of the video. Herein, the target direction may be determined according to the display mode of the video. For example, in a case where the video is displayed on in a horizontal screen of the terminal device, the target direction may be the horizontal direction. In a case where the video is displayed in a vertical screen of the terminal device, the target direction may be vertical.

In another possible implementation, search words may also be displayed in the comment information. Correspondingly, the embodiment of the application also provides a method for realizing the search, which includes the following four steps in addition to the above steps.

At G1: The comment information in the comment page of the video is obtained.

The comment page of the video contains a user's comments on the video, and the comment information in the comment page of the video is obtained.

At G2: At least one second related search word is determined from the comment information.

Based on the comment information, at least one second related search word is determined. The second related search word may be the same search word as the first related search word or a different search word.

G3: The second related search word are displayed in a corresponding position in the comment information in the form of a link.

The search result page of the second related search word has corresponding page links. The second related search word in the comment information is displayed in a corresponding position of the second related search word in the form of a link. Specifically, the form of the link may be, for example, an indicator for search which may be added, or a form of adding an underline, and a changed display color of the second related search word. Herein the indicator for search may be an indicator with a magnifying glass added at an upper right corner of the second related search word. An icon of the indicator of the magnifying glass is located at a height the same as the height of the text. In addition, when using the added indicator for search, it is also necessary to adjust the display position of the first related search word to avoid the indicator being alone at the beginning of a line of the comment information.

It should be noted that, in order to avoid the second related search words appearing too densely, a strategy of breaking up the different second related search words and a strategy of frequency control of the occurrence of the second related search words may be adopted to control the distribution position of the second related search word in the comment information. For example, it may be set that there is at most one second related search word in the comment information, and the number of second related search words in the displayed comment page corresponding to the video does not exceed four.

In addition, in order to make the second related search word more obvious and convenient for users to trigger, there may be a certain distance between the second related search word and the adjacent text. The distance may be specifically 1 pixel.

In addition, a sensitive word service or audit model may be used to check the second related search word, and in a case where a second related search word is sensitive, it will not be displayed.

In some cases, some videos and some comments may also be set in advance to stop showing the second related search words in the comment page of the video. Specifically, for example, it may be determined whether the video is a video that does not display the second related search word according to the identification of the video.

At G4: in response to a trigger on the second related search word, the search page of the second related search word is displayed.

The user may trigger the second related search word in the comment information. In response to a trigger on the second related search word, the search page of the second related search word is presented to the user. The display mode and layout of the search page of the second related search word may be the same as the search result page of the first related search word, please refer to the above for details, and the details will not be repeated here.

Based on the above contents, it can be seen that by selecting the second related search word from the comment information and displaying it in a way of link, it is convenient for a user to trigger the second related search word according to the search need when browsing the comment information, thus shortening the search path of the user, meeting the derivative search need of the user after browsing comments more efficiently and reducing the input cost of the user.

In one possible implementation, the second related search words are determined from the entity words according to one or more of the occurrence times of the entity words in the comment information, the search times of the entity words and/or related words matched with the entity words after the video is played, and the relevance between the entity words and the video.

Herein, entity words are entity words in text strings except the target character string in the comment information. The target character string is a text string connected with a specific character in the comment information. For example, considering that there may be comments that remind other users to watch videos, the specific character may be set as "@", the user account connected with "@" is a text string connected with the specific character, and the target character string is "@ account."

Entity words may be obtained by word segmentation and NER (Named Entity Recognition) service performed on the comment information.

The second related search words are determined from the entity words according to one or more of the appearance times of the entity words in the comment information, the search times of the entity words and/or related words matched with the entity words after the video is played, and the relevance between the entity words and the video.

The number of times the entity words appear in the comment information may be the number of times the entity words appearing in the comment information in the currently displayed comment page, or the number of times the entity words appearing in all the comment information for the video.

Entity words also have matched related words, which may be words with the same or similar meaning as entity words. For example, related words may be nicknames of entity words. Or for example, related words may also be approximate words belonging to the same field as entity words. For example, the entity word is "shooting" and the related word may be "sports". Some users will search for interested content after watching the video. Based on the search times of entity words and/or related words matched with entity words after playing the video, the second related search word that users may need to search may be determined.

In the comment information, there may also be entity words unrelated to the content of the video. Based on this, the relevance between the entity words and the video may also be measured, and the entity words are determined as the target second related search word according to the relevance.

It should be noted that the second related search word may be determined by the server. The server may send the determined second related search word to the terminal device, and the terminal device adjusts the display of the comment page. In one possible implementation, the terminal device may also check the first related search word to improve the accuracy of the second related search word issued by the server.

In the embodiment of the application, the target second related search word may be accurately determined from the entity words through one or more of occurrence times, users' search times and the relevance to the video, so that the target second related search word provided to the user is more accurate and meet the search needs of the users.

Further, in a case where a click through rate of the target second related search word is lower than a through rate threshold, the target second related search word is displayed in the corresponding position in the comment information in the form of text.

Herein the target second related search word is any one or more of the second related search word. In a case where the CTR (Click-Through-Rate) of the target second related search word is lower than the through rate threshold, it means that probability of triggering the target second related search word is low, and the target second related search word may be converted into a text form and displayed in the corresponding position in the comment information, that is to say, the display of the target second related search word as a trigger-able form may be stopped. Specifically, the through rate threshold may be 0.01%.

In the embodiment of the present application, by comparing the click through rate of the target second related search word with the through rate threshold, the target second related search word with low trigger probability may be converted into the text form, so as to reduce the second related search word with less triggers.

Based on the method for realizing the search provided by the above method embodiment, the embodiment of the application also provides an apparatus for realizing the search, and the apparatus for realizing the search will be described in combination with the attached drawings.

Figure 9:
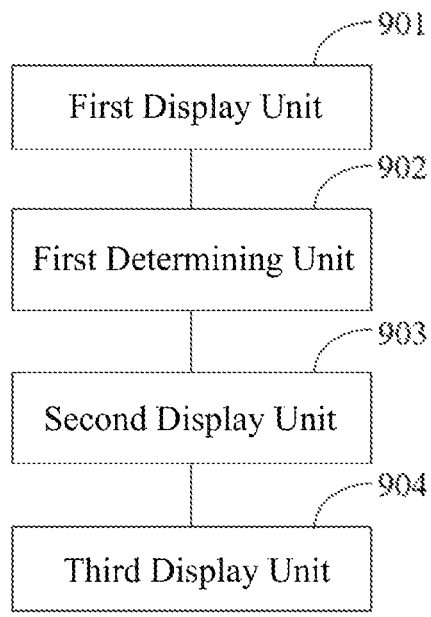
FIG. 9 is a schematic structural diagram of an apparatus for realizing search provided by an embodiment of the present application.

Refer to FIG. 9, and FIG. 9 is a schematic structural diagram of an apparatus for realizing search provided by an embodiment of the present application. As shown in FIG. 9, the apparatus for realizing search includes:

a first display unit 901, configured to display a comment page of a video in response to a comment trigger request for the video;

a first determining unit 902, configured to determine at least one first related search word, wherein the first related search word is determined based on the video content of the video and/or the comment information in the comment page;

a second display unit 903, configured to display the first related search word in a preset area of the comment page; and a third display unit 904, configured to display a search result page of the first related search word in response to a trigger on the first related search word.

In one possible implementation, the first related search word includes a plurality of words, and the second display unit includes:

an identification sub-unit, configured to identify an attribute category of the first related search word; and a first presentation sub-unit, configured to display the first related search word of each attribute category in a preset area corresponding to the attribute category on the comment page.

In one possible implementation, in a case where the attribute category of the first related search word is a commodity type, the third display unit includes:

a second display sub-unit, configured to display a plurality of types of first multimedia resources corresponding to the first related search word in the first display area on the search result page in response to a trigger on the first related search word; wherein the first multimedia resources include multimedia contents and commodity information contents, and the multimedia contents include any one of commodity recommendation video, commodity live broadcast video and commodity multimedia content extracted from a commodity detail page; and the first multimedia resources are displayed in the form of multimedia cards, and the multimedia cards are arranged in the preset direction; and a third presentation sub-unit, configured to display search result videos corresponding to the first related search word in the second display area on the search result page.

In one possible implementation, the commodity information content is obtained based on the multimedia content, and the apparatus further includes:

a fourth display unit, configured to, in response to a trigger on the target multimedia content, display the commodity recommendation videos, commodity live broadcast rooms or commodity detail pages corresponding to the target multimedia contents according to the preset display mode; wherein the target multimedia content of the commodity is a multimedia content included in any multimedia card; and a fifth display unit, configured to, in response to a trigger on a target commodity information content, display the commodity purchase page corresponding to the target commodity information content; wherein the target commodity information content is a commodity information content included in any multimedia card.

In one possible implementation, in a case where the attribute category of the first related search word is an event type, the third display unit includes:

a fourth presentation sub-unit, configured to, in response to a trigger on the first related search word, display the multimedia cards corresponding to respective event time points in an order of the event time points on the search result page; wherein, each multimedia card is used for displaying an event video and event text information corresponding to the corresponding event time point.

In one possible implementation, the apparatus further includes:

a sixth display unit, configured to display the target event video according to the preset display mode in response to a trigger on the target event video; wherein the target event video is any one of the event videos;

a seventh display unit, configured to display the next event video corresponding to the target event video according to the preset display mode in response to a first sliding operation in a vertical direction; wherein the sequence number of the next event video on the search result page is greater than the sequence number of the target event video; and an eighth display unit, configured to, in response to a second sliding operation in a vertical direction, display the previous event video corresponding to the target event video in the preset display mode; wherein the sequence number of the previous event video on the search result page is smaller than the sequence number of the target event video.

In one possible implementation, in a case where the attribute category of the first related search word is an encyclopedia entity type, the third display unit includes:

a fifth display sub-unit, configured to display encyclopedia critical text information corresponding to the first related search word and at least one dimension of the second multimedia resource in the first display area on the search result page in response to a trigger on the first related search word; wherein the second multimedia resource of each dimension corresponds to the encyclopedia attribute type to which the first related search word belong; and the second multimedia resources of respective dimensions are displayed in the form of multimedia cards, which are arranged in the preset direction; and a sixth presentation sub-unit, configured to display search result videos corresponding to the first related search word in the second display area on the search result page of the first related search word.

In one possible implementation, the second multimedia resource of each dimension includes a plurality of encyclopedia videos; the apparatus further includes:

a ninth display unit, configured to, in response to a trigger on a target encyclopedia video, display the target encyclopedia video according to the preset display mode; wherein the target encyclopedia video is an encyclopedia video included in any multimedia card;

a tenth display unit, configured to display the next encyclopedia video corresponding to the target encyclopedia video in response to a first sliding operation in a vertical direction; wherein in a case where the target encyclopedia video is not the last encyclopedia video in the current multimedia card, the sequence number of the next encyclopedia video in the current multimedia card is greater than the sequence number of the target encyclopedia video in the current multimedia card; or, in a case where the target encyclopedia video is the last encyclopedia video in the current multimedia card, the sequence number of the multimedia card corresponding to the next encyclopedia video is greater than the sequence number of the multimedia card corresponding to the target encyclopedia video; and an eleventh display unit, configured to, in response to a second sliding operation in a vertical direction, display a previous encyclopedia video corresponding to the target encyclopedia video in the preset display mode; wherein, in a case where the target encyclopedia video is not the first encyclopedia video in the current multimedia card, the sequence number of the previous encyclopedia video in the current multimedia card is smaller than the sequence number of the target encyclopedia video in the current multimedia card, or in a case where the target encyclopedia video is the first encyclopedia video in the current multimedia card, the sequence number of the multimedia card corresponding to the previous encyclopedia video is smaller than the sequence number of the multimedia card corresponding to the target encyclopedia video.

In one possible implementation, in a case where the attribute category of the first related search word is a query type, the third display unit includes:

a seventh display sub-unit, configured to display third multimedia resources in the first display area on the search result page in response to a trigger on the first related search word, wherein the third multimedia resource includes a target video and a plurality of critical pictures corresponding to the target video; wherein the first display area includes a first sub-area and a second sub-area, wherein the target video is displayed in the first sub-area and part or all of the critical pictures are displayed in the second sub-area, and the dimensions of the first sub-area and the second sub-area are the same in the preset direction; and an eighth presentation sub-unit, configured to display search result videos corresponding to the first related search word in the second display area on the search result page of the first related search word.

In one possible implementation, the first related search word is determined according to the video content of the video, the text information included in the video, and the target comment information of the video, which is obtained based on the comment information in the comment page.

In one possible implementation, the first display unit is specifically used to realize the following:

in response to a comment trigger request for the video, the comment page of the video is displayed floating above the video;

or, in response to the comment trigger request for the video, the comment page displaying the video is displayed by popping up from the target direction of the video.

In one possible implementation, the apparatus further includes:

an obtaining unit, configured to obtain comment information in the comment page of the video;

a second determining unit, configured to determine at least one second related search word from the comment information;

a twelfth display unit, configured to display the second related search word in the corresponding position in the comment information in the form of a link; and a thirteenth display unit, configured to display the search page of the second related search word in response to a trigger on the second related search word.

In one possible implementation, the second related search words are determined from the entity words according to one or more of the occurrence times of the entity words in the comment information, the search times of the entity words and/or related words matched with the entity words after the video is played, and the relevance between the entity words and the video; wherein, the entity word is an entity word in the text string except the target character string in the comment information, and the target character string is a text string connected with a specific character in the comment information.

In one possible implementation, in a case where the click through rate of a target second related search word is lower than the through rate threshold, the target second related search word is displayed in the corresponding position in the comment information in the form of text, and the target second related search word is any one or more of the second related search word.

The embodiment of the application also provides an electronic device, which includes: at least one processor; a storage apparatus, on which at least one program is stored, and when the at least one program is executed by the at least one processor, the at least one processor realizes the search method.

Figure 10:
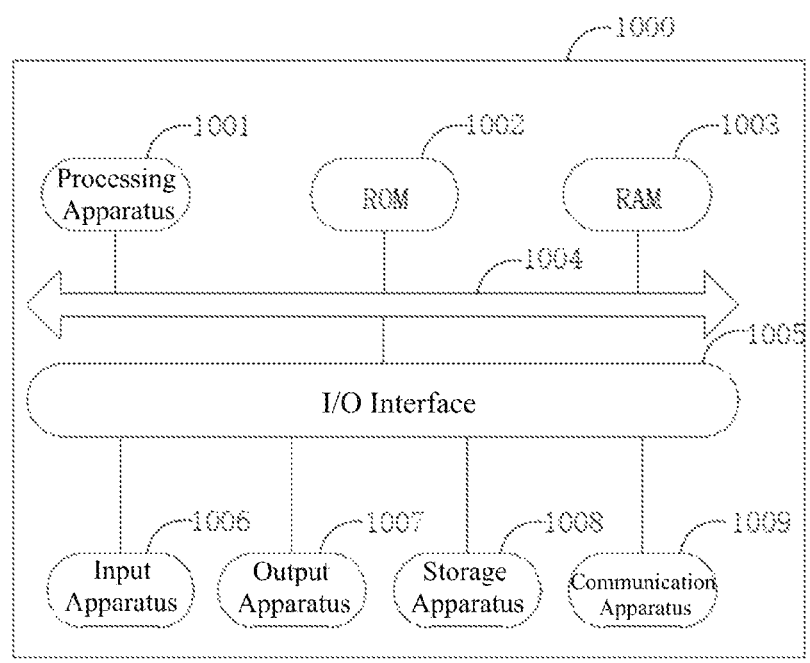
FIG. 10 is a schematic diagram of a basic structure of an electronic device provided by an embodiment of the present application.

Reference is now made to FIG. 10, which shows a structural schematic diagram of an electronic device suitable for implementing an embodiment of the present disclosure. The electronic device in the embodiment of the present disclosure may include, but are not limited to, mobile terminals such as mobile phones, notebook computers, digital broadcast receivers, PDA (Personal Digital Assistant), PAD (Tablet Computer), PMP (Portable Multimedia Player), vehicle-mounted terminals (such as vehicle-mounted navigation terminals) and fixed terminals such as digital TV, desktop computers and the like, and may also include server devices. The electronic device shown in FIG. 10 is only an example, and should not bring any limitation to the function and application scope of the embodiment of the present disclosure.

As shown in FIG. 10, an electronic device 1000 may include a processing apparatus (such as a central processing unit, a graphics processor, etc.) 1001, which may perform various appropriate actions and processes according to a program stored in a Read-Only Memory (ROM) 1002 or a program loaded from a storage apparatus 908 into a Random Access Memory (RAM) 1003. In the RAM 1003, various programs and data required for the operation of electronic device are also stored. The processing apparatus 1001, the ROM 1002 and the RAM 1003 are connected to each other through a bus 1004. An input/output (I/O) interface 1005 is also connected to the bus 1004.

Generally, the following apparatuses may be connected to the I/O interface 1005: an input apparatus 1006 including, for example, a touch screen, a touch pad, a keyboard, a mouse, a camera, a microphone, an accelerometer, a gyroscope, etc.; an output apparatus 1007 including, for example, a Liquid Crystal Display (LCD), a speaker, a vibrator, etc. a storage apparatus 1008 such as a magnetic tape, a hard disk, etc.; and a communication apparatus 1009. The communication apparatus 1009 may allow the electronic device to communicate wirelessly or wired with other devices to exchange data. Although FIG. 10 shows an electronic device with various devices, it should be understood that it is not required to implement or have all the apparatuses shown. More or fewer apparatuses may alternatively be implemented or provided.

In particular, according to an embodiment of the present disclosure, the process described above with reference to the flowchart may be implemented as a computer software program. For example, embodiments of the present disclosure include a computer program commodity including a computer program carried on a non-transitory computer-readable medium, which contains program codes for executing the method shown in the flowchart. In such an embodiment, the computer program may be downloaded and installed from the network through the communication apparatus 1009, or installed from the storage apparatus 1008, or installed from the ROM 1002. When the computer program is executed by the processing apparatus 1001, the above functions defined in the method of the embodiment of the present disclosure are performed.

The electronic device provided by the embodiment of the application belongs to the same inventive concept as the method for realizing search provided by the above embodiment, and the technical details not described in detail in this embodiment may be found in the above embodiment, and this embodiment has the same beneficial effects as the above embodiment.

Based on the method for realizing search provided by the above method embodiment, the embodiment of the application provides a computer storage medium, and instructions are stored in the computer-readable storage medium, which, when run on a terminal device, cause the terminal device to execute the above method for realizing search.

It should be noted that the computer-readable medium mentioned in this application may be a computer-readable signal medium or a computer-readable storage medium or any combination of the two. The computer-readable storage medium may be, for example, but not limited to, an electrical, magnetic, optical, electromagnetic, infrared, or semiconductor system, apparatus or device, or a combination of any of the above. More specific examples of computer-readable storage media may include, but are not limited to, an electrical connection with one or more wires, a portable computer disk, a hard disk, a Random Access Memory (RAM), a Read-Only Memory (ROM), an Erasable Programmable Read-Only Memory (EPROM or flash memory), an optical fiber, a portable Compact Disk Read-Only Memory (CD-ROM), an optical storage apparatus, a magnetic storage apparatus, or any suitable combination of the above. In this application, a computer-readable storage medium may be any tangible medium containing or storing a program, which may be used by or in combination with an instruction execution system, apparatus or device. In this application, the computer-readable signal medium may include data signals propagated in baseband or as part of a carrier wave, in which computer-readable program codes are carried. This propagated data signal may take many forms, including but not limited to electromagnetic signals, optical signals or any suitable combination of the above. A computer-readable signal medium may also be any computer-readable medium other than a computer-readable storage medium, which may send, propagate or transmit a program for use by or in connection with an instruction execution system, apparatus or device. The program codes contained in the computer-readable medium may be transmitted by any suitable medium, including but not limited to: wires, optical cables, RF (Radio Frequency) and the like, or any suitable combination of the above.

In some embodiments, the client and the server may communicate by using any currently known or future developed network protocol such as HTTP (HyperText Transfer Protocol), and may be interconnected with digital data communication in any form or medium (for example, communication network). Examples of communication networks include a Local Area Network ("LAN"), a Wide Area Network ("WAN"), the Internet (for example, the Internet) and end-to-end networks (for example, ad hoc end-to-end networks), as well as any currently known or future developed networks.

The computer-readable medium may be included in the electronic device; or it may exist alone without being assembled into the electronic device.

The computer-readable medium carries one or more programs, which, when executed by the electronic device, cause the electronic device to execute the search method.

Computer program codes for performing the operations of the present application may be written in one or more programming languages or their combinations, including but not limited to object-oriented programming languages, such as Java, Smalltalk, C++, and conventional procedural programming languages, such as "C" language or similar programming languages. The program codes may be completely executed on the user's computer, partially executed on the user's computer, executed as an independent software package, partially executed on the user's computer and partially executed on a remote computer, or completely executed on a remote computer or server. In the case involving a remote computer, the remote computer may be connected to a user computer through any kind of network, including a Local Area Network (LAN) or a Wide Area Network (WAN), or may be connected to an external computer (for example, through the Internet using an Internet service provider).

The flowcharts and block diagrams in the drawings illustrate the architecture, functions and operations of possible implementations of systems, methods and computer program commodities according to various embodiments of the present application. In this regard, each block in the flowchart or block diagram may represent a module, a program segment, or a part of code that contains one or more executable instructions for implementing specified logical functions. It should also be noted that in some alternative implementations, the functions noted in the blocks may occur in a different order than those noted in the drawings. For example, two blocks shown in succession may actually be executed substantially in parallel, and they may sometimes be executed in the reverse order, depending on the functions involved. It should also be noted that each block in the block diagrams and/or flowcharts, and combinations of blocks in the block diagrams and/or flowcharts, may be implemented by a dedicated hardware-based system that performs specified functions or operations, or by a combination of dedicated hardware and computer instructions.

The units involved in the embodiment described in this application may be realized by software or hardware. Herein the name of the unit/module does not limit the unit itself in some cases. For example, a voice data acquisition module may also be described as a "data acquisition module".

The functions described above herein may be at least partially performed by one or more hardware logic components. For example, without limitation, exemplary types of hardware logic components that may be used include: Field Programmable Gate Array (FPGA), Application Specific Integrated Circuit (ASIC), Application Specific Standard commodity (ASSP), System on Chip (SOC), Complex Programmable Logic Device (CPLD) and so on.

In the context of this application, a machine-readable medium may be a tangible medium, which may contain or store a program for use by or in combination with an instruction execution system, apparatus or device. The machine-readable medium may be a machine-readable signal medium or a machine-readable storage medium. A machine-readable medium may include, but is not limited to, an electronic, magnetic, optical, electromagnetic, infrared, or semiconductor system, apparatus or device, or any suitable combination of the above. More specific examples of the machine-readable storage medium may include an electrical connection based on one or more wires, a portable computer disk, a hard disk, a Random Access Memory (RAM), a Read-Only Memory (ROM), an Erasable Programmable Read-Only Memory (EPROM or flash memory), an optical fiber, a convenient Compact Disk Read-Only Memory (CD-ROM), an optical storage apparatus, a magnetic storage apparatus, or any suitable combination of the above.

According to one or more embodiments of the present application, [Example 1] provides a method for realizing search, which includes the following steps that:
  in response to a comment trigger request for a video, the comment page of the video is displayed;
  at least one first related search word is determined, wherein the first related search word is determined based on the video content of the video and/or the comment information in the comment page;
  the first related search word is displayed in the preset area of the comment page; and
  in response to a trigger on the first related search word, the search result page of the first related search word is displayed.

According to one or more embodiments of the present application, [Example 2] provides a method for realizing search, wherein the first related search word includes a plurality of words, and the displaying the first related search word in the preset area of the comment page includes the following steps that:
  the attribute category of the first related search word is identified; and
  the first related search word of each attribute category is displayed in the preset area corresponding to each attribute category on the comment page.

According to one or more embodiments of the present application, [Example 3] provides a method for realizing search. In a case where the attribute category of the first related search word is a commodity type, the search result page of the first related search word is displayed in response to a trigger on the first related search word, including the following steps that:
  in response to a trigger on the first related search word, a plurality of types of first multimedia resources corresponding to the first related search word are displayed in the first display area on the search result page; wherein the first multimedia resources include multimedia contents and commodity information contents, and the multimedia contents include any one of commodity recommendation video, commodity live broadcast video and commodity multimedia content extracted from a commodity detail page; the first multimedia resources are displayed in the form of multimedia cards, and the multimedia cards are arranged in the preset direction; and
  search result videos corresponding to the first related search word are displayed in the second display area on the search result page.

According to one or more embodiments of the present application, [Example 4] provides a method for realizing search, and the commodity information content is obtained based on the multimedia content, and the method further includes the following steps that:
  in response to a trigger on a target multimedia content, the commodity recommendation videos, commodity live broadcast rooms or commodity detail pages corresponding to the target multimedia content are displayed according to the preset display mode; wherein the target multimedia content of the commodity is a multimedia content included in any multimedia card; and
  in response to a trigger on a target commodity information content, the commodity purchase page corresponding to the target commodity information content is displayed; wherein the target commodity information content is a commodity information content included in any multimedia card.

According to one or more embodiments of the present application, [Example 5] provides a method for realizing search. In a case where the attribute category of the first related search word is an event type, the search result page of the first related search word is displayed in response to a trigger on the first related search word, including the following step that:
  in response to a trigger on the first related search word, the multimedia cards corresponding to respective event time points are displayed in the search result page in an order of the event time points; wherein, each multimedia card is used for displaying an event video and event text information corresponding to the corresponding event time point.

According to one or more embodiments of the present application, [Example 6] provides a method for realizing search, which further includes:
  in response to a trigger on a target event video, the target event video is displayed according to the preset display mode; wherein the target event video is any one of the event videos;
  in response to a first sliding operation in a vertical direction, the next event video corresponding to the target event video is displayed in the preset display mode; wherein the sequence number of the next event video on the search result page is greater than the sequence number of the target event video; and
  in response to the second sliding operation in the vertical direction, the previous event video corresponding to the target event video is displayed in the preset display mode; wherein the sequence number of the previous event video on the search result page is smaller than the sequence number of the target event video.

According to one or more embodiments of the present application, [Example 7] provides a method for realizing search. In a case where the attribute category of the first related search word is an encyclopedia entity type, the displaying the search result page of the first related search word in response to a trigger on the first related search word includes the following steps that:
  in response to a trigger on the first related search word, the encyclopedia critical text information corresponding to the first related search word and at least one dimension of the second multimedia resource are displayed in the first display area on the search result page; wherein the second multimedia resource of each dimension corresponds to an attribute of the encyclopedia type to which the first related search word belong; and the second multimedia resources of respective dimensions are displayed in the form of multimedia cards, which are arranged in a preset direction; and
  search result videos corresponding to the first related search word are displayed in the second display area on the search result page of the first related search word.

According to one or more embodiments of the present application, [Example 8] provides a method for realizing search, and the second multimedia resource of each dimension includes a plurality of encyclopedia videos; the method further includes the following steps that:

in response to a trigger on a target encyclopedia video, the target encyclopedia video is displayed according to the preset display mode; wherein the target encyclopedia video is an encyclopedia video included in any multimedia card;

in response to a first sliding operation in a vertical direction, the next encyclopedia video corresponding to the target encyclopedia video is displayed; wherein in a case where the target encyclopedia video is not the last encyclopedia video in the current multimedia card, the sequence number of the next encyclopedia video in the current multimedia card is greater than the sequence number of the target encyclopedia video in the current multimedia card; or, in a case where the target encyclopedia video is the last encyclopedia video in the current multimedia card, the sequence number of the multimedia card corresponding to the next encyclopedia video is greater than the sequence number of the multimedia card corresponding to the target encyclopedia video; and in response to a second sliding operation in the vertical direction, the previous encyclopedia video corresponding to the target encyclopedia video is displayed in the preset display mode; wherein, in a case where the target encyclopedia video is not the first encyclopedia video in the current multimedia card, the sequence number of the previous encyclopedia video in the current multimedia card is smaller than the sequence number of the target encyclopedia video in the current multimedia card, or in a case where the target encyclopedia video is the first encyclopedia video in the current multimedia card, the sequence number of the multimedia card corresponding to the previous encyclopedia video is smaller than the sequence number of the multimedia card corresponding to the target encyclopedia video.

According to one or more embodiments of the present application, [Example 9] provides a method for realizing search. In a case where the attribute category of the first related search word is a query type, the search result page of the first related search word is displayed in response to a trigger on the first related search word, including the following steps that:

in response to a trigger on the first related search word, the third multimedia resource is displayed in the first display area on the search result page, wherein the third multimedia resource includes a target video and a plurality of critical pictures corresponding to the target video; wherein the first display area includes a first sub-area and a second sub-area, wherein the target video is displayed in the first sub-area and part or all of the critical pictures are displayed in the second sub-area, and the dimensions of the first sub-area and the second sub-area are the same in the preset direction; and search result videos corresponding to the first related search word are displayed in the second display area on the search result page of the first related search word.

According to one or more embodiments of the application, [Example 10] provides a method for realizing search, wherein the first related search word is determined according to the video content of the video, the text information included in the video and the target comment information of the video, and the target comment information is obtained based on the comment information in the comment page.

According to one or more embodiments of the present application, [Example 11] provides a method for realizing search, and the displaying of the comment page of the video in response to the comment trigger request for the video includes the following steps that:

in response to a comment trigger request for the video, the comment page of the video is displayed floating above the video;

or, in response to the comment trigger request for the video, the comment page displaying the video is displayed by popping up from the target direction of the video.

According to one or more embodiments of the present application, [Example 12] provides a method for realizing search, which further includes the following steps that:

the comment information in the comment page of the video is obtained;

at least one second related search word is determined from the comment information;

the second related search word is displayed in the corresponding position in the comment information in the form of a link; and in response to a trigger on the second related search word, the search page of the second related search word is displayed.

According to one or more embodiments of the present application, [Example 13] provides a method for realizing search, and the second related search words are determined from the entity words according to one or more of the appearance times of the entity words in the comment information, the search times of the entity words and/or related words matched with the entity words after the video is played, and the relevance between the entity words and the video; wherein, the entity word is an entity word in a text string except a target character string in the comment information, and the target character string is a text string connected with a specific character in the comment information.

According to one or more embodiments of the application, [Example 14] provides a method for realizing search. In a case where a click through rate of the target second related search word is lower than a through rate threshold, the target second related search word is displayed in the corresponding position in the comment information in the form of text, and the target second related search word is any one or more of the second related search word.

According to one or more embodiments of the present application, [Example 15] provides an apparatus for realizing search, which includes:

a first display unit, configured to display the comment page of the video in response to the comment trigger request for the video;

a first determining unit, configured to determine at least one first related search word, wherein the first related search word is determined based on the video content of the video and/or the comment information in the comment page;

a second display unit, configured to display the first related search word in the preset area of the comment page; and a third display unit, configured to display the search result page of the first related search word in response to a trigger on the first related search word.

According to one or more embodiments of the present application, [Example 16] provides an apparatus for realizing search, wherein the first related search word includes a plurality of words, and the second display unit includes:

an identification sub-unit, configured to identify the attribute category of the first related search word; and a first displaying sub-unit, configured to display the first related search word of each attribute category in the preset area corresponding to the attribute category on the comment page.

According to one or more embodiments of the present application, [Example 17] provides an apparatus for realizing search. In a case where the attribute category of the first related search word is a commodity type, the third display unit includes:

a second display sub-unit, configured to display a plurality of types of first multimedia resources corresponding to the first related search word in the first display area on the search result page in response to a trigger on the first related search word; wherein the first multimedia resources include multimedia contents and commodity information contents, and the multimedia contents include any one of commodity recommendation video, commodity live broadcast video and commodity multimedia content extracted from a commodity detail page; and the first multimedia resources are displayed in the form of multimedia cards, and the multimedia cards are arranged in the preset direction; and a third presentation sub-unit, configured to display search result videos corresponding to the first related search word in the second display area on the search result page.

According to one or more embodiments of the present application, [Example 18] provides an apparatus for realizing search, and the commodity information content is obtained based on the multimedia content, and the apparatus further includes:

a fourth display unit, configured to, in response to a trigger on the target multimedia content, display the commodity recommendation videos, commodity live broadcast rooms or commodity detail pages corresponding to the target multimedia contents according to the preset display mode; wherein the target multimedia content of the commodity is a multimedia content included in any multimedia card; and a fifth display unit, configured to, in response to a trigger on a target commodity information content, display the commodity purchase page corresponding to the target commodity information content; wherein the target commodity information content is a commodity information content included in any multimedia card.

According to one or more embodiments of the present application, [Example 19] provides an apparatus for realizing search. In a case where the attribute category of the first related search word is an event type, the third display unit includes:

a fourth displaying sub-unit, configured to, in response to a trigger on the first related search word, display the multimedia cards corresponding to respective event time points in an order of the event time points on the search result page; wherein, each multimedia card is used for displaying an event video and event text information corresponding to the corresponding event time point.

According to one or more embodiments of the application, [Example 20] provides an apparatus for realizing search, and the apparatus further includes: a sixth display unit, configured to display a target event video according to the preset display mode in response to a trigger on the target event video; wherein the target event video is any one of the event videos;

a seventh display unit, configured to display the next event video corresponding to the target event video according to the preset display mode in response to a first sliding operation in a vertical direction; wherein the sequence number of the next event video on the search result page is greater than the sequence number of the target event video; and an eighth display unit, configured to, in response to a second sliding operation in a vertical direction, display the previous event video corresponding to the target event video in the preset display mode; wherein the sequence number of the previous event video on the search result page is smaller than the sequence number of the target event video.

According to one or more embodiments of the present application, [Example 21] provides an apparatus for realizing search. In a case where the attribute category of the first related search word is an encyclopedia entity type, the third display unit includes:

a fifth display sub-unit, configured to display encyclopedia critical text information corresponding to the first related search word and at least one dimension of the second multimedia resource in the first display area on the search result page in response to a trigger on the first related search word; wherein the second multimedia resource of each dimension corresponds to the attribute of the encyclopedia type to which the first related search word belong; and the second multimedia resources of respective dimensions are displayed in the form of multimedia cards, which are arranged in the preset direction; and a sixth display sub-unit, configured to display search result videos corresponding to the first related search word in the second display area on the search result page of the first related search word.

According to one or more embodiments of the present application, [Example 22] provides an apparatus for realizing search, and the second multimedia resource of each dimension includes a plurality of encyclopedia videos; the apparatus further includes:

a ninth display unit, configured to, in response to a trigger on a target encyclopedia video, display the target encyclopedia video according to the preset display mode; wherein the target encyclopedia video is an encyclopedia video included in any multimedia card;

a tenth display unit, configured to display the next encyclopedia video corresponding to the target encyclopedia video in response to a first sliding operation in a vertical direction; wherein in a case where the target encyclopedia video is not the last encyclopedia video in the current multimedia card, the sequence number of the next encyclopedia video in the current multimedia card is greater than the sequence number of the target encyclopedia video in the current multimedia card; or, in a case where the target encyclopedia video is the last encyclopedia video in the current multimedia card, the sequence number of the multimedia card corresponding to the next encyclopedia video is greater than the sequence number of the multimedia card corresponding to the target encyclopedia video; and an eleventh display unit, configured to, in response to a second sliding operation in a vertical direction, display a previous encyclopedia video corresponding to the target encyclopedia video in the preset display mode; wherein, in a case where the target encyclopedia video is not the first encyclopedia video in the current multimedia card, the sequence number of the previous encyclopedia video in the current multimedia card is smaller than the sequence number of the target encyclopedia video in the current multimedia card, or in a case where the target encyclopedia video is the first encyclopedia video in the current multimedia card, the sequence number of the multimedia card corresponding to the previous encyclopedia video is smaller than the sequence number of the multimedia card corresponding to the target encyclopedia video.

According to one or more embodiments of the present application, [Example 23] provides an apparatus for realizing search. In a case where the attribute category of the first related search word is a query type, the third display unit includes:

- a seventh display sub-unit, configured to display third multimedia resources in the first display area on the search result page in response to a trigger on the first related search word, wherein the third multimedia resource includes a target video and a plurality of critical pictures corresponding to the target video; wherein the first display area includes a first sub-area and a second sub-area, wherein the target video is displayed in the first sub-area and part or all of the critical pictures are displayed in the second sub-area, and the dimensions of the first sub-area and the second sub-area are the same in the preset direction; and
- an eighth display sub-unit, configured to display search result videos corresponding to the first related search word in the second display area on the search result page of the first related search word.

According to one or more embodiments of the application, [Example 24] provides an apparatus for realizing search, wherein the first related search word is determined according to the video content of the video, the text information included in the video and the target comment information of the video, and the target comment information is obtained based on the comment information in the comment page.

According to one or more embodiments of the present application, [Example 25] provides an apparatus for realizing search, and the first display unit is specifically used to realize the following steps that:

- in response to a comment trigger request for the video, a comment page of the video is displayed floating above the video;
- or, in response to the comment trigger request for the video, the comment page displaying the video is displayed by popping up from the target direction of the video.

According to one or more embodiments of the present application, [Example 26] provides an apparatus for realizing search, and the apparatus further includes:

- an obtaining unit, configured to obtain the comment information in the comment page of the video;
- a second determining unit, configured to determine at least one second related search word from the comment information;
- a twelfth display unit, configured to display the second related search word in the corresponding position in the comment information in the form of a link;
- a thirteenth display unit, configured to display the search page of the second related search word in response to a trigger on the second related search word.

According to one or more embodiments of the present application, [Example 27] provides an apparatus for realizing search, and the second related search words are determined from the entity words according to one or more of the appearance times of the entity words in the comment information, the search times of the entity words and/or related words matched with the entity words after the video is played, and the relevance between the entity words and the video; wherein, the entity word is an entity word in the text string except the target character string in the comment information, and the target character string is the text string connected with the specific character in the comment information.

According to one or more embodiments of the application, [Example 28] provides an apparatus for realizing search. In a case where the click through rate of a target second related search word is lower than the through rate threshold, the target second related search word is displayed in the corresponding position in the comment information in the form of text, and the target second related search word is any one or more of the second related search word.

According to one or more embodiments of the present application, [Example 29] provides an electronic device, including:

- at least one processor;
- a storage apparatus on which at least one program is stored,
- wherein when the at least one program is executed by the at least one processor, the at least one processor may realize the method for searching.

According to one or more embodiments of the present application, [Example 30] provides a computer-readable medium, on which a computer program is stored, wherein the program, when executed by the processor, realizes the above-mentioned method for realizing search.

It should be noted that each embodiment in this specification is described in a progressive way, and each embodiment focuses on the differences from other embodiments, so it is only necessary to refer to the same and similar parts between each embodiment. As for the system or apparatus disclosed in the embodiment, since it corresponds to the method disclosed in the embodiment, the description is relatively simple, and the relevant points may be found in the description of the method part.

It should be understood that in this application, "at least one (item)" means one or more, and "multiple" means two or more. "And/or" is used to describe the relationship of related objects, indicating that there may be three kinds of relationships. For example, "A and/or B" may indicate: there are only A, only B and both A and B, wherein A and B may be singular or plural. The character "/" generally indicates that context objects are an "OR" relationship. "At least one of the following items" or its similar expression refers to any combination of these items, including any combination of a single item or plural items. For example, at least one of a, b or c may be expressed as: a, b, c, a and b, a and c, b and c, or a and b and c, wherein a, b and c may be single or multiple.

It should also be noted that in this paper, relational terms such as first and second are only used to distinguish one entity or operation from another entity or operation, and do not necessarily require or imply that there is any such actual relationship or order between these entities or operations. Moreover, the terms "including", "comprising" or any other variation thereof are intended to cover non-exclusive inclusion, so that a process, method, article or device including a series of elements includes not only those elements, but also other elements not explicitly listed or elements inherent to such a process, method, article or device. Without further restrictions, an element defined by the phrase "including one" does not exclude the existence of other identical elements in the process, method, article or device including the element.

The steps of a method or algorithm described in connection with the embodiments disclosed herein may be directly implemented in hardware, a software module executed by a processor, or a combination of the two. The software module may be placed in Random Access Memory (RAM), internal memory, Read-Only Memory (ROM), electrically programmable ROM, electrically erasable programmable ROM, register, hard disk, removable disk, CD-ROM, or any other storage medium known in the technical field.

The foregoing description of the disclosed embodiments enables those skilled in the art to make or use this application. Many modifications to these embodiments will be obvious to those skilled in the art, and the general principles defined herein may be implemented in other embodiments without departing from the spirit or scope of this application. Therefore, this application will not be limited to the embodiments shown herein, but is to be accorded the widest scope consistent with the principles and novel features disclosed herein.

What is claimed is:

1. A method for realizing search, comprising:
   displaying a comment page in response to receiving a request for commenting on a video;
   determining at least one first related search word based on video content of the video or comment information in the comment page;
   displaying the at least one first related search word in a preset area of the comment page; and
   in response to a trigger on the at least one first related search word, displaying a search result page of the at least one first related search word,
   wherein in response to determining that an attribute category of the at least one first related search word is encyclopedia entity type, the displaying the search result page of the at least one first related search word further comprises:
   displaying encyclopedia critical text information corresponding to the at least one first related search word and a multimedia resource of at least one dimension in a first display area on the search result page in response to the trigger on the at least one first related search word, wherein the multimedia resource of the at least one dimension corresponds to one attribute of the encyclopedia type to which the at least one first related search word belong,
   displaying the multimedia resource of the at least one dimension in a form of multimedia cards, wherein the multimedia cards are arranged in a preset direction, and
   displaying search result videos corresponding to the at least one first related search word in a second display area on the search result page of the at least one first related search word.

2. The method according to claim 1, wherein in a case where the attribute category of the at least one first related search word is a commodity type, the displaying the search result page of the at least one first related search word in response to a trigger on the at least one first related search word comprises:
   in response to the trigger on the at least one first related search word, displaying a plurality of types of first multimedia resources corresponding to the at least one first related search word in a first display area on the search result page; wherein the first multimedia resources include multimedia contents and commodity information contents, and the multimedia contents include any one of commodity recommendation video, commodity live broadcast video and commodity multimedia content extracted from a commodity detail page; the first multimedia resources are displayed in the form of multimedia cards, and the multimedia cards are arranged in a preset direction; and
   displaying search result videos corresponding to the at least one first related search word in the second display area on the search result page.

3. The method according to claim 2, wherein the commodity information content is obtained based on the multimedia content, and the method further comprises:
   in response to a trigger on a target multimedia content, displaying a commodity recommendation video, a commodity live broadcast room or a commodity detail page corresponding to the target multimedia content according to a preset display mode; wherein the target multimedia content of the commodity is a multimedia content included in any multimedia card; and
   in response to a trigger on a target commodity information content, displaying a commodity purchase page corresponding to the target commodity information content; wherein the target commodity information content is a commodity information content included in any multimedia card.

4. The method according to claim 1, wherein in a case where the attribute category of the at least one first related search word is an event type, the displaying the search result page of the at least one first related search word in response to a trigger on the at least one first related search word comprises:
   in response to a trigger on the at least one first related search word, displaying the multimedia cards corresponding to respective event time points in the search result page in an order of the event time points; wherein, each multimedia card is used for displaying an event video and event text information corresponding to the corresponding event time point.

5. The method according to claim 4, wherein the method further comprises:
   in response to a trigger on a target event video, displaying the target event video according to a preset display mode; wherein the target event video is any one of the event videos;
   in response to a first sliding operation in a vertical direction, displaying a next event video corresponding to the target event video in the preset display mode; wherein a sequence number of the next event video on the search result page is greater than a sequence number of the target event video; and
   in response to a second sliding operation in the vertical direction, displaying a previous event video corresponding to the target event video in the preset display mode; wherein a sequence number of the previous event video on the search result page is smaller than a sequence number of the target event video.

6. The method according to claim 1, wherein the multimedia resource of the at least one dimension includes a plurality of encyclopedia videos; the method further comprises:
   in response to a trigger on a target encyclopedia video, displaying the target encyclopedia video according to the preset display mode; wherein the target encyclopedia video is an encyclopedia video included in any multimedia card;

displaying a next encyclopedia video corresponding to the target encyclopedia video in response to a first sliding operation in a vertical direction; wherein in a case where the target encyclopedia video is not the last encyclopedia video in the current multimedia card, a sequence number of the next encyclopedia video in the current multimedia card is greater than a sequence number of the target encyclopedia video in the current multimedia card; or, in a case where the target encyclopedia video is the last encyclopedia video in the current multimedia card, a sequence number of the multimedia card corresponding to the next encyclopedia video is greater than a sequence number of the multimedia card corresponding to the target encyclopedia video; and in response to a second sliding operation in the vertical direction, displaying a previous encyclopedia video corresponding to the target encyclopedia video in the preset display mode; wherein, in a case where the target encyclopedia video is not the first encyclopedia video in the current multimedia card, a sequence number of the previous encyclopedia video in the current multimedia card is smaller than a sequence number of the target encyclopedia video in the current multimedia card, or in a case where the target encyclopedia video is the first encyclopedia video in the current multimedia card, a sequence number of the multimedia card corresponding to the previous encyclopedia video is smaller than a sequence number of the multimedia card corresponding to the target encyclopedia video.

7. The method according to claim 1, wherein, in a case where the attribute category of the at least one first related search word is query type, the displaying the search result page of the at least one first related search word in response to a trigger on the at least one first related search word comprises:

in response to a trigger on the at least one first related search word, displaying a third multimedia resource in the first display area on the search result page, wherein the third multimedia resource includes a target video and a plurality of critical pictures corresponding to the target video; wherein the first display area includes a first sub-area and a second sub-area, wherein the target video is displayed in the first sub-area and part or all of the critical pictures are displayed in the second sub-area, and dimensions of the first sub-area and the second subarea are the same in a preset direction; and displaying search result videos corresponding to the at least one first related search word in the second display area on the search result page of the at least one first related search word.

8. The method according to claim 1, wherein the at least one first related search word is determined according to the video content of the video, text information included in the video and target comment information of the video, and the target comment information is obtained based on the comment information in the comment page.

9. The method according to claim 1, wherein the displaying the comment page comprises:

displaying the comment page by floating the comment page above the video; or displaying the comment page by popping up the comment page from a target direction of the video.

10. The method according to claim 1, wherein the method further comprises:

obtaining the comment information in the comment page of the video;

determining at least one second related search word from the comment information;

displaying the at least one second related search word in a corresponding position in the comment information in the form of a link; and in response to a trigger on the at least one second related search word, displaying a search page of the second related search word.

11. The method according to claim 10, wherein the at least one second related search words are determined from entity words according to one or more of occurrence times of the entity words in the comment information, search times of the entity words and/or related words matching the entity words after the video is played, and relevance between the entity words and the video; wherein, the entity word is an entity word in a character string except a target character string in the comment information, and the target character string is a text string connected with a specific character in the comment information.

12. The method according to claim 10, wherein in a case where a click through rate of the target second related search word is lower than a through rate threshold, the target second related search word is displayed in a corresponding position in the comment information in the form of text, and the target second related search word is any one or more of the second related search word.

13. The method according to claim 1, wherein the at least one first related search word comprises a plurality of search words, and wherein the displaying the at least one first related search word in the preset area of the comment page further comprises:

identifying an attribute category of each of the plurality of search words; and displaying different attribute categories of search words in different preset areas of the comment page.

14. An electronic device, comprising:

at least one processor; and a storage apparatus, on which at least one program is stored, wherein when the at least one program is executed by the at least one processor, the at least one program causes the at least one processor to perform operations comprising:

displaying a comment page in response to receiving a request for commenting on a video;

determining at least one first related search word based on video content of the video or comment information in the comment page;

displaying the at least one first related search word in a preset area of the comment page; and in response to a trigger on the at least one first related search word, displaying a search result page of the at least one first related search word, wherein in response to determining that an attribute category of the at least one first related search word is encyclopedia entity type, the displaying the search result page of the at least one first related search word further comprises:

displaying encyclopedia critical text information corresponding to the at least one first related search word and a multimedia resource of at least one dimension in a first display area on the search result page in response to the trigger on the at least one first related search word, wherein the multimedia resource of the at least one dimension corresponds to one attribute of the encyclopedia type to which the at least one first related search word belong, displaying the multimedia resource of the at least one dimension in a form of multimedia cards, wherein the multimedia cards are arranged in a preset direction, and displaying search result videos corresponding to the at least one first related search word in a second display area on the search result page of the at least one first related search word.

15. A non-transitory computer-readable storage medium, with a computer program stored thereon, wherein the program, when executed by a processor, causes the processor to implement operations comprising:

displaying a comment page in response to receiving a request for commenting on a video;

determining at least one first related search word based on video content of the video or comment information in the comment page;

displaying the at least one first related search word in a preset area of the comment page; and in response to a trigger on the at least one first related search word, displaying a search result page of the at least one first related search word, wherein in response to determining that an attribute category of the at least one first related search word is encyclopedia entity type, the displaying the search result page of the at least one first related search word further comprises:

displaying encyclopedia critical text information corresponding to the at least one first related search word and a multimedia resource of at least one dimension in a first display area on the search result page in response to the trigger on the at least one first related search word, wherein the multimedia resource of the at least one dimension corresponds to one attribute of the encyclopedia type to which the at least one first related search word belong, displaying the multimedia resource of the at least one dimension in a form of multimedia cards, wherein the multimedia cards are arranged in a preset direction, and displaying search result videos corresponding to the at least one first related search word in a second display area on the search result page of the at least one first related search word.

\* \* \* \* \*